(12) United States Patent
Kageyama et al.

(10) Patent No.: US 7,414,344 B2
(45) Date of Patent: Aug. 19, 2008

(54) COMMUTATOR AND AN ARMATURE

(75) Inventors: Ryohei Kageyama, Hamamatsu (JP); Nobuo Kasao, Kosai (JP); Toshiyuki Osawa, Hamamatsu (JP); Yuichi Terada, Hamamatsu (JP); Toshihiro Tanino, Hamamatsu (JP); Yoshiki Nakano, Hamamatsu (JP)

(73) Assignee: ASMO Co., Ltd, Koshai-shi (JP)

( * ) Notice: Subject to any disclaimer, the term of this patent is extended or adjusted under 35 U.S.C. 154(b) by 43 days.

(21) Appl. No.: 11/489,239

(22) Filed: Jul. 19, 2006

(65) Prior Publication Data
US 2007/0046128 A1 Mar. 1, 2007

(30) Foreign Application Priority Data
Jul. 19, 2005 (JP) ............... 2005-209124
Jul. 19, 2005 (JP) ............... 2005-209134

(51) Int. Cl.
*H02K 27/02* (2006.01)

(52) U.S. Cl. .................. 310/233; 310/151
(58) Field of Classification Search ............... 310/204, 310/234, 233, 151
See application file for complete search history.

(56) References Cited

U.S. PATENT DOCUMENTS

| 5,710,473 | A | * | 1/1998 | Nobe et al. | .................. 310/236 |
| 6,057,626 | A | | 5/2000 | Tanaka et al. | |
| 6,181,046 | B1 | | 1/2001 | Daikoku et al. | |
| 6,246,141 | B1 | * | 6/2001 | Bailey | .......................... 310/211 |
| 2005/0189841 | A1 | * | 9/2005 | Potocnik | ...................... 310/236 |
| 2007/0069603 | A1 | * | 3/2007 | Terada et al. | ................. 310/234 |

FOREIGN PATENT DOCUMENTS

| JP | 2000-134873 | | 5/2000 |
| JP | 2005137193 | A * | 5/2005 |

* cited by examiner

*Primary Examiner*—Thanh Lam
(74) *Attorney, Agent, or Firm*—Fulwider Patton LLP

(57) ABSTRACT

A commutator main body 11 includes a plurality of commutator pieces 13 arranged along a circumference, the center of which is a rotation axis L of a motor, and a main body insulator 14 holding the commutator pieces. A short-circuit member 12 is arranged on an end portion of the commutator main body 11 and includes a short-circuit conductor 21, which short-circuits predetermined ones of the commutator pieces, and a short-circuit insulator 22, in which the short-circuit member is embedded. A boss is formed integrally with the short-circuit insulator so as to project from the end portion of the commutator main body.

9 Claims, 5 Drawing Sheets

COMMUTATOR AND AN ARMATURE

RELATED APPLICATIONS:

This application claims the benefit of foreign priority from Japanese Patent Application No. 2005-209124, filed Jul. 19, 2005, and Japanese Patent Application No. 2005-209134, filed Jul. 19, 2005.

BACKGROUND OF THE INVENTION

The present invention relates to a commutator in which predetermined commutator pieces are short-circuited, and to an armature.

In the prior art, an armature for a motor having power feeding brushes may include a commutator in which a plurality of commutator pieces are short-circuited. Such a motor allows electric current to flow even to commutator pieces that are not in contact with power feeding brushes by short-circuiting predetermined commutator pieces. This enables a reduction in the number of power feeding brushes required in the motor.

In one example, in a rotation machine described in Japanese Laid-Open Patent Publication No. 2000-134873, short-circuit wires for short-circuiting commutator pieces are arranged on an end portion of a commutator.

However, when the short-circuit wires are arranged on the end portion of the commutator, the short-circuit wires may rub against one another or the short-circuit wires may rub against coils and cause an electric connection (layer short). This would lower yield during the manufacturing of the armature or cause erroneous operation.

SUMMARY OF THE INVENTION

The present invention has been made to solve the above problems, and it is an object of the present invention to provide a commutator and an armature that prevent layer short-circuiting and have a high additional value.

To achieve the above object, one aspect of the present invention provides a commutator for a motor. The commutator has a commutator main body including a plurality of commutator pieces arranged along a circumference, the center of which is a rotation axis of the motor, and a main body insulator holding the commutator pieces. A short-circuit member is arranged on an end portion of the commutator main body and includes a short-circuit conductor, which short-circuits predetermined ones of the commutator pieces, and a short-circuit insulator, in which the short-circuit member is embedded. A boss is formed integrally with the short-circuit insulator so as to project from the end portion of the commutator main body.

A further aspect of the present invention provides an armature including a commutator for a motor. The commutator has a commutator main body including a plurality of commutator pieces arranged along a circumference, the center of which is a rotation axis of the motor, and a main body insulator holding the commutator pieces. A short-circuit member is arranged on an end portion of the commutator main body and includes a short-circuit conductor, which short-circuits predetermined ones of the commutator pieces, and a short-circuit insulator, in which the short-circuit member is embedded. A boss is formed integrally with the short-circuit insulator so as to project from the end portion of the commutator main body. The armature further includes a rotation shaft arranged to extend through the axis of the commutator. An armature core is fixed to the rotation shaft so as to be axially aligned with the commutator and includes a plurality of teeth. A plurality of coils are wound around each of the teeth of the armature core.

DETAILED DESCRIPTION OF THE PRESENT EMBODIMENTS

Figure 1:
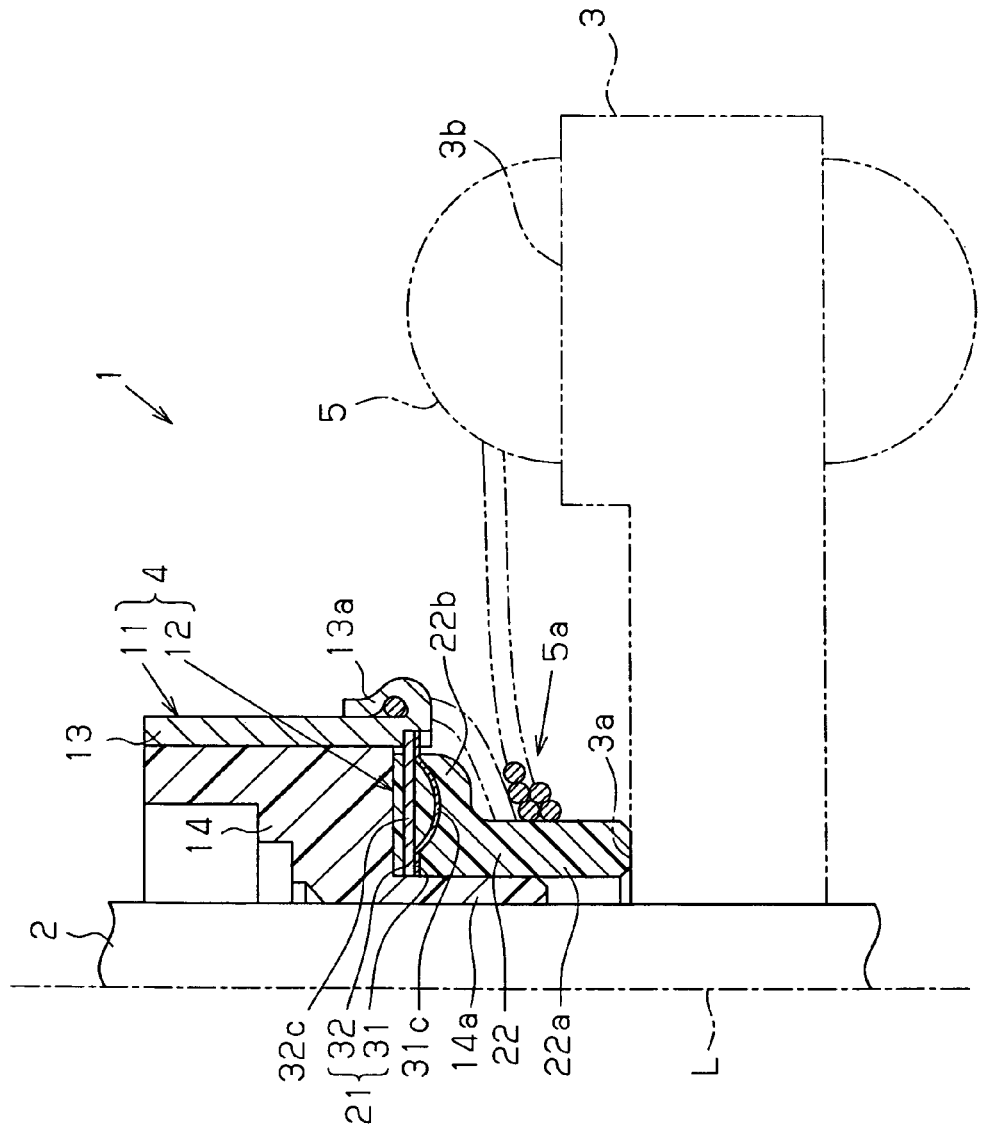
FIG. 1 is a schematic structural diagram of an armature according to one embodiment.

A present embodiment of the present invention will now be described with reference to FIGS. 1 to 7B. A motor includes a stator (not shown) and an armature 1, which is shown in FIG. 1. The stator has a plurality of permanent magnets that are arranged in the circumferential direction around a rotation axis L of the motor. FIG. 1 only shows one side of the armature 1 with respect to its axis, or with respect to the rotation axis L of the motor.

The armature 1 includes a metal rotation shaft 2, an armature core 3 fixed to the rotation shaft 2, a commutator 4 fixed to the rotation shaft 2, and coils 5. The rotation shaft 2 is rotatably supported by the stator. The armature core 3 is surrounded by the permanent magnets of the stator.

The armature core 3 has a tubular portion 3a, through which the rotation shaft 2 is inserted, and a plurality of teeth 3b (only one is shown in FIG. 1), which extend radially outward from the tubular portion 3a. The coils 5 are wound around the teeth 3b.

The commutator 4 includes a commutator main body 11 and a short-circuit member 12, which is arranged at an axial end portion of the commutator main body 11. The commutator main body 11 includes a plurality of (in the present embodiment, twenty-four in 15-degree intervals) commutator pieces 13 that are arranged in the circumferential direction. The commutator main body 11 further includes a generally cylindrical main body insulator 14, which holds the radially inner side of the commutator pieces 13. The commutator pieces 13 are formed by dividing a cylinder in the circumferential direction along the outer circumference of the main body insulator 14. Anode and cathode power feeding brushes (not shown) are pressed against the commutator pieces 13 in a slidable manner from the radially outer side.

The lower end of each commutator piece 13 projects downward from the main body insulator 14 and is bent radially outward to form a wire connection portion 13a for hooking a coil 5. The main body insulator 14 is made of a thermosetting resin (a phenol resin in the present embodiment). A cylindrical portion 14a, which functions as a wall, extends in the axially downward at the center of the lower portion of the main body insulator 14. The inner diameter of the main body insulator 14 including the cylindrical portion 14a is set to enable the rotation shaft 2 to be pressed-fitted therein.

The short-circuit member 12 includes a short-circuit conductor 21 and a short-circuit insulator 22. The short-circuit conductor 21 short-circuits commutator pieces 13 that are separated from each other by a predetermined angular interval (120 degrees in the present embodiment). The short-circuit insulator 22 holds the short-circuit conductor 21 in a state embedded in the short-circuit insulator 22.

Figure 2:
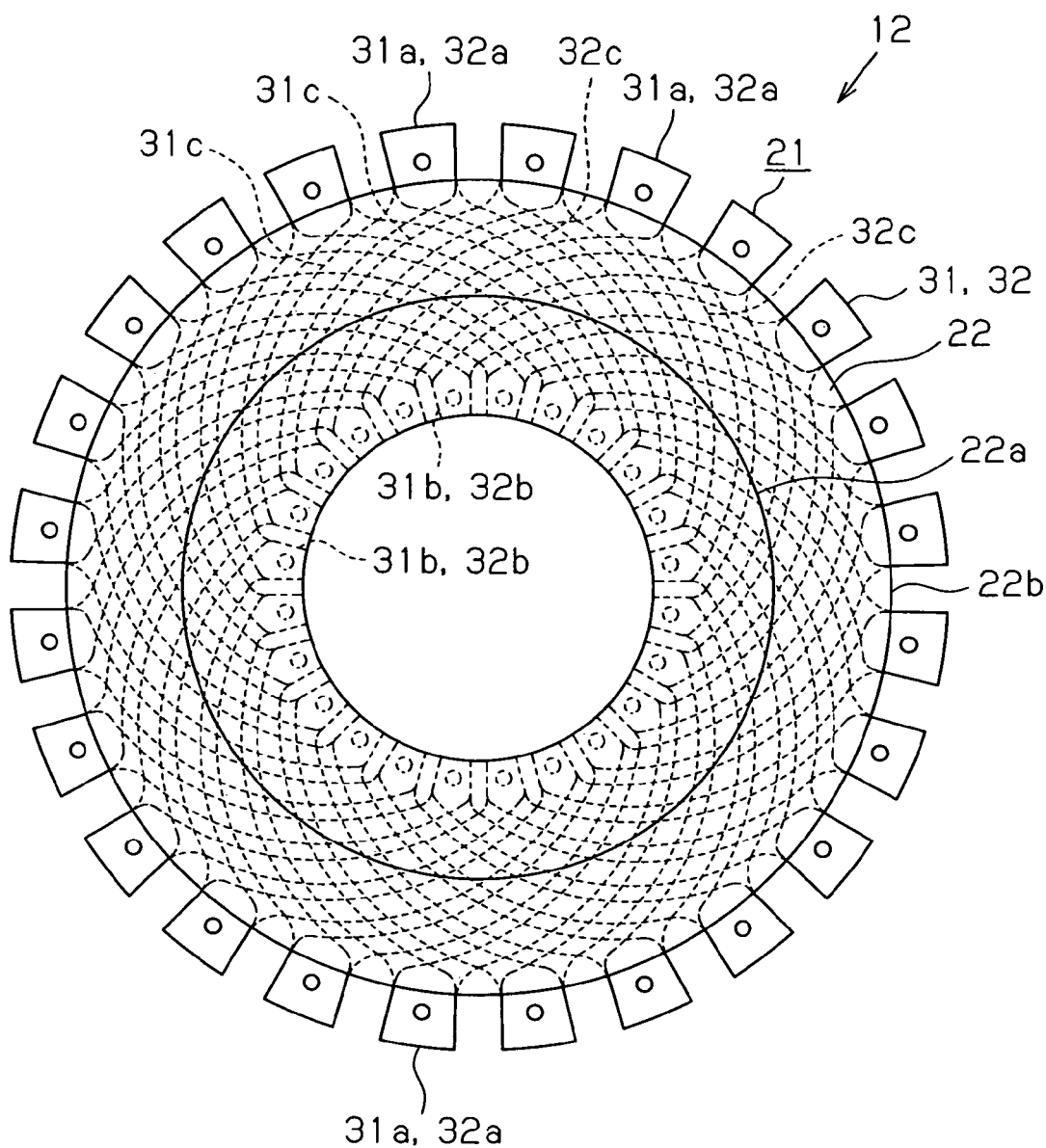
FIG. 2 is a plan view showing a short-circuit member.

The short-circuit conductor 21 includes two superimposed short-circuit member formation groups 31 and 32. In FIG. 1, the first short-circuit member formation group 31 is arranged under the second short-circuit member formation group 32. As shown in FIG. 2, the short-circuit member formation groups 31 and 32 include a plurality of outer terminals 31a and 32a, a plurality of inner terminals 31b and 32b, and a plurality of linking portions 31c and 32c. The outer terminals 31a and 32a are arranged in the circumferential direction of the rotation shaft 2. The inner terminals 31b and 32b are arranged in the circumferential direction of the rotation shaft 2 inward from the outer terminals 31a and 32a. The linking portions 31c and 32c link the outer terminals 31a and 32a and the inner terminals 31b and 32b. The short-circuit member formation groups 31 and 32 are formed as layers respectively arranged along two substantially parallel flat planes. Thus, the short-circuit member formation group 31 never intersects the other short-circuit member formation group 32. In the present embodiment, the short-circuit member formation group 31 includes twenty-four outer terminals 31a, twenty-four inner terminals 31b, and twenty-four linking portions 31c, and the short-circuit member formation group 32 includes twenty-four outer terminals 32a, twenty-four inner terminals 32b, and twenty-four linking portions 32c.

Figure 3:
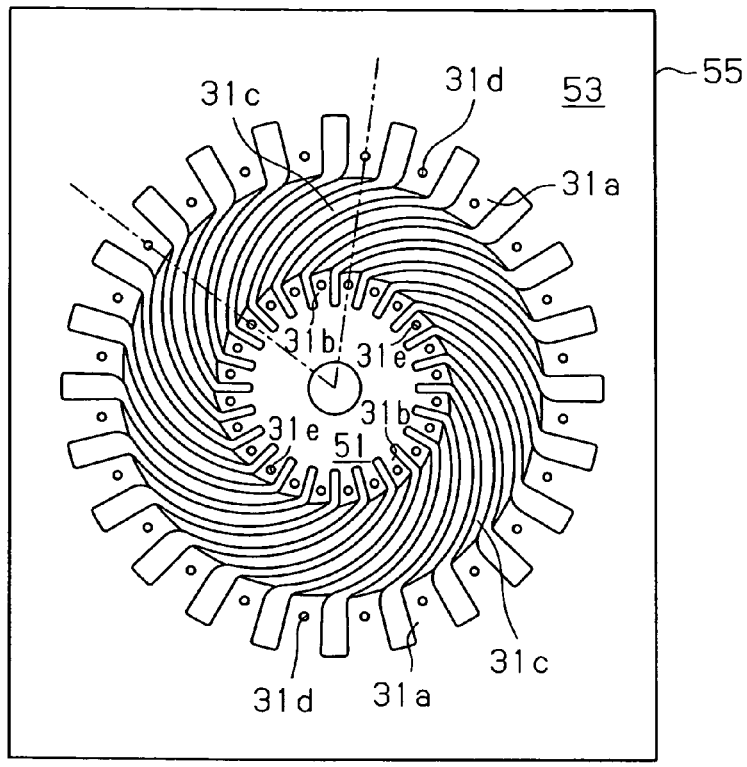
FIG. 3 is a schematic diagram illustrating a method for manufacturing the armature.
Figure 4:
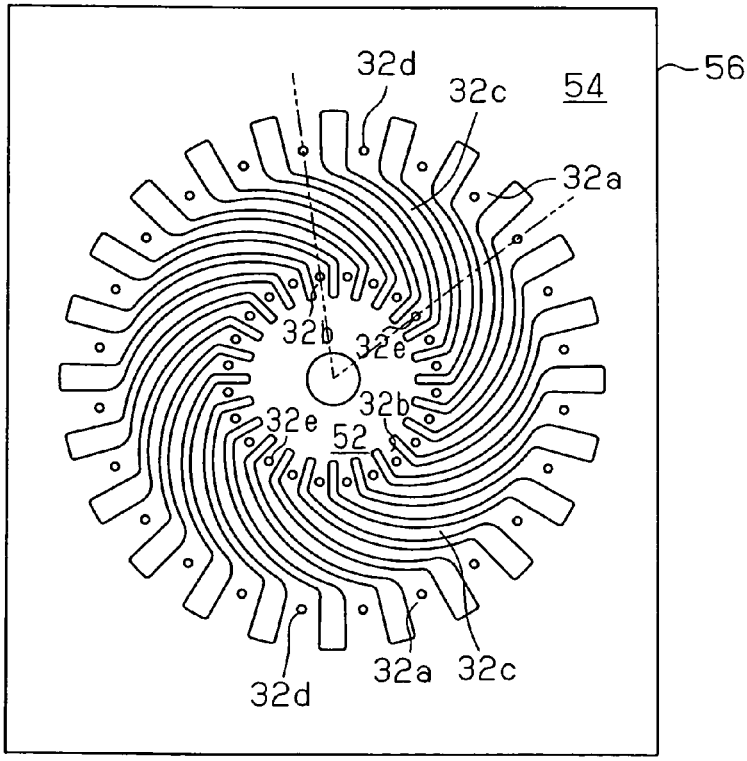
FIG. 4 is a schematic diagram illustrating the method for manufacturing the armature.

The linking portions 31c and 32c in the short-circuit member formation groups 31 and 32 link the corresponding outer terminals 31a and 32a and the corresponding inner terminals 31b and 32b at positions separated from each other by a predetermined angle (60 degrees corresponding to four terminals in the present embodiment). As shown in FIG. 3, each linking portion 31c in the lower first short-circuit member formation group 31 links one of the outer terminals 31a to one of the inner terminals 31b, which is located at a position separated from that outer terminal 31a by the predetermined angle in the counterclockwise direction. As shown in FIG. 4, each linking portion 32c in the upper second short-circuit member formation group 32 links one of the outer terminals 32a to one of the inner terminals 32b, which is located at a position separated from that outer terminal 32a by the predetermined angle in the clockwise direction. Further, the linking portions 31c and 32c in the present embodiment extend along an involute curve.

The lower short-circuit member formation group 31 is thinner than the upper short-circuit member formation group 32 and is formed from a material having a small electric resistivity. In the present embodiment, the lower short-circuit member formation group 31 is formed from a copper material and the upper short-circuit member formation group 32 is formed from a brass material. In the short-circuit member formation groups 31 and 32, the different parts (the outer terminals 31a and 32a, the inner terminals 31b and 32b, and the linking portions 31c and 32c) each have a constant thickness.

The linking portions 31c in the lower short-circuit member formation group 31 are curved to project axially downward with respect to the outer terminals 31a and the inner terminals 31b. To ease visual understanding, FIG. 1 shows cross-sections taken along the linking portions 31c and 32c. Further, the linking portions 32c in the upper short-circuit member formation group 32 lie along the same plane as the outer terminals 32a and the inner terminals 32b. When the short-circuit member formation groups 31 and 32 are superimposed, the outer terminals 31a and 32a come in contact with one another and the inner terminals 31b and 32b come in contact with one another in the superimposing direction. The linking portions 31c and 32c do not come in contact with each other.

The short-circuit member formation groups 31 and 32 are crimped and fixed to each other. In detail, the outer terminals 31a and the inner terminals 31b in the lower short-circuit member formation group 31 have holes 31d and 31e (refer to FIG. 6(a)) that are formed beforehand. The outer terminals 32a and the inner terminals 32b in the upper short-circuit member formation group 32 have projections 32d and 32e (refer to FIG. 6(a)) that are formed beforehand. The short-circuit member formation groups 31 and 32 are arranged so that when they are superimposed, the projections 32d and 32e extend through the holes 31d and 31e (refer to FIG. 6(b)) to be crimped. The crimping deforms the tips of the projections 32d and 32e and covers the openings of the holes 31d and 31e so that the projections 32d and 32e are fixed to the corresponding holes 31d and 31e (refer to FIG. 6(b)). The short-circuit member 12 with this structure electrically connects the twenty-four outer terminals 31a, and 32a arranged at 120-degree intervals and the twenty-four inner terminals 31b and 32b arranged at 120-degree intervals.

In the short-circuit member formation groups 31 and 32 of the present embodiment, the outer terminals 31a and 32a are spot-welded together and the inner terminals 31b and 32b are spot-welded together (not shown). In detail, the surfaces of the short-circuit member formation groups 31 and 32 in the present embodiment are tin-plated in advance. The above welding melts and bonds the tin plating between the outer terminals 31a and 32a or between the inner terminals 31b and 32b. This stabilizes and reduces the contact resistance.

The short-circuit insulator 22 is made of a thermoplastic resin and differs in material from the main body insulator 14, which is made of a thermosetting resin. The short-circuit insulator 22 keeps parts of the short-circuit conductor 21, or the short-circuit member formation groups 31 and 32 (the outer terminals 31a and 32a, the inner terminals 31b and 32b, and the linking portions 31c and 32c), spaced from one another. The short-circuit insulator 22 is also arranged in the superimposing direction of the short-circuit member formation groups 31 and 32, or at both sides of the axial direction, to cover and embed the short-circuit conductor 21 (short-circuit member formation groups 31 and 32) except for the outer terminals 31a and 32a.

A boss 22a, which extends from the axial end portion of the commutator main body 11, is integrally formed with the short-circuit insulator 22. Further, the short-circuit insulator 22 has a large-diameter portion 22b at a basal end portion of the boss 22a. The large-diameter portion 22b projects downward in the axial direction from the axial end portion of the commutator main body 11 and has an outer diameter greater than the outer diameter of the boss 22a. The inner diameter of the tubular short-circuit insulator 22 is equal to the outer diameter of the cylindrical portion 14a of the main body insulator 14. The short-circuit insulator 22 enables the cylindrical portion 14a to be fitted therein. The short-circuit insulator 22 has a circular cross-section (refer to FIG. 1) in a manner that its outer diameter changes smoothly from the large-diameter portion 22b to the boss 22a.

The outer diameter of the short-circuit member 22, that is, the outer diameter of the large-diameter portion 22b, which is the outer diameter at the vicinity of the short-circuit conductor 21, is slightly smaller than the cylindrical surface along which the commutator pieces 13 are arranged along the circumferential direction.

The short-circuit member 12 is arranged on the axial end portion of the commutator main body 11 to electrically connect its outer terminals 31a and 32a to the commutator pieces 13. In detail, lower ends of the commutator pieces 13 are formed to have recesses 13b (refer to FIG. 7(a)) corresponding to the outer terminals 31a and 32a. In a state in which the outer terminals 31a and 32a are arranged in the recesses 13b, the two side walls of the recesses 13b are crimped. The crimped walls are deformed to partially cover the outer terminals 31a and 32a. As a result, the short-circuit member 12 is fixed to the commutator main body 11 (refer to FIG. 7(b)).

Figure 7A:
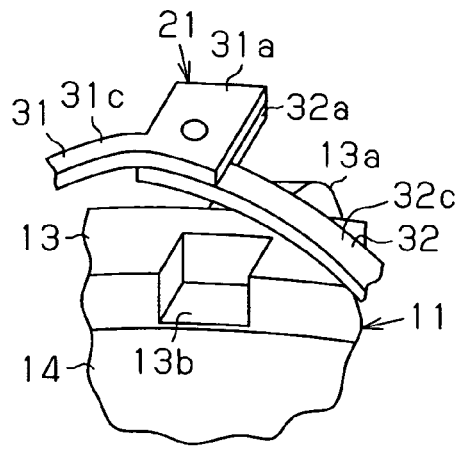
FIGS. 7(a) and 7(b) are schematic diagrams illustrating the method for manufacturing the armature.
Figure 7B:
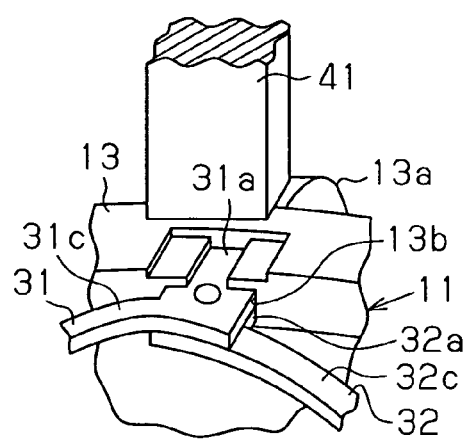

FIGS. 7(a) and 7(b) do not show the short-circuit insulator 22 of the short-circuit member 12 and schematically shows only the short-circuit conductor 21 of the short-circuit member 12. FIG. 7(b) additionally shows a jig or, punch 41, used for crimping. As shown in FIG. 1, the cylindrical portion 14a of the main body insulator 14 is fitted in the short-circuit insulator 22. Further, the vicinity of the short-circuit conductor 21 in the short-circuit insulator 22 is accommodated in a gap located inside the axial end portion of the commutator main body 11.

As shown in FIG. 1, the armature core 3 and the commutator 4 of the above-described structure are aligned in the axial direction with respect to the rotation shaft 2, which is inserted through the tubular portion 3a and the cylindrical portion 14a. Further, the commutator 4 comes in contact with the tubular portion 3a of the armature core 3 at the distal surface of the boss 22a. The boss 22a functions as a guide that supports the coil 5, or the so-called crossover wire 5a, that extends from a wire connection portion 13a of a commutator piece 13 to a predetermined tooth 3b located at a position separated from that wire connection portion 13a in the circumferential direction. More specifically, the boss 22a guides the coil 5 to prevent the coil 5 from coming into direct contact with the rotation shaft 2 or to prevent each coil 5 from being abruptly bent with a sharp curvature.

The method for manufacturing the commutator 4 for the armature 1 with the above-described structure will now be described. First, a method for manufacturing the short-circuit member 12 will be described. The method for manufacturing the short-circuit member 12 includes a punching process, a superimposing process, an insulator filling process, and a removing process.

In the punching process, as shown in FIGS. 3 and 4, conductive plates 55 and 56 are punched out in a manner that the linking portions 31c and 32c in the short-circuit member formation groups 31 and 32 are formed spaced from one another, and inner linking portions 51 and 52 and outer linking portions 53 and 54 for annularly linking the linking portions 31c and 32c respectively at the inner side and the outer side in the radial direction are formed. In this state, the conductive plates 55 and 56 are punched out in a manner that the outer terminals 31a and 32a are formed spaced from one another in the circumferential direction, and the inner terminals 31b and 32b are formed spaced from one another in the circumferential direction. At the same time, the holes 31d and 31e and the projections 32d and 32e are formed. Further, at the same time, the linking portions 31c in the first short-circuit member formation group 31 are curved to project toward one side in the axial direction from the outer terminals 31a and the inner terminals 31b.

The conductive plates 55 and 56 are punched out in a direction opposite to the direction in which the surfaces of the second short-circuit member formation groups 31 and 32 face toward each other. More specifically, the conductive plate 55 corresponding to the first short-circuit member formation group 31 is punched out downward in FIG. 1. The conductive plate 56 corresponding to the second short-circuit member formation group 32 is punched out upward in FIG. 1. Further, the conductive plate 55, which corresponds to the first short-circuit member formation group 31, is thinner than the conductive plate 56, which corresponds to the second short-circuit member formation group 32, and is formed from a material having a smaller electrical resistivity than the conductive plate 56. The conductive plate 55 is formed from a copper material, and the conductive plate 56 is formed from a brass material. Tin plating is applied to the surfaces of the conductive plates 55 and 56.

Figure 5:
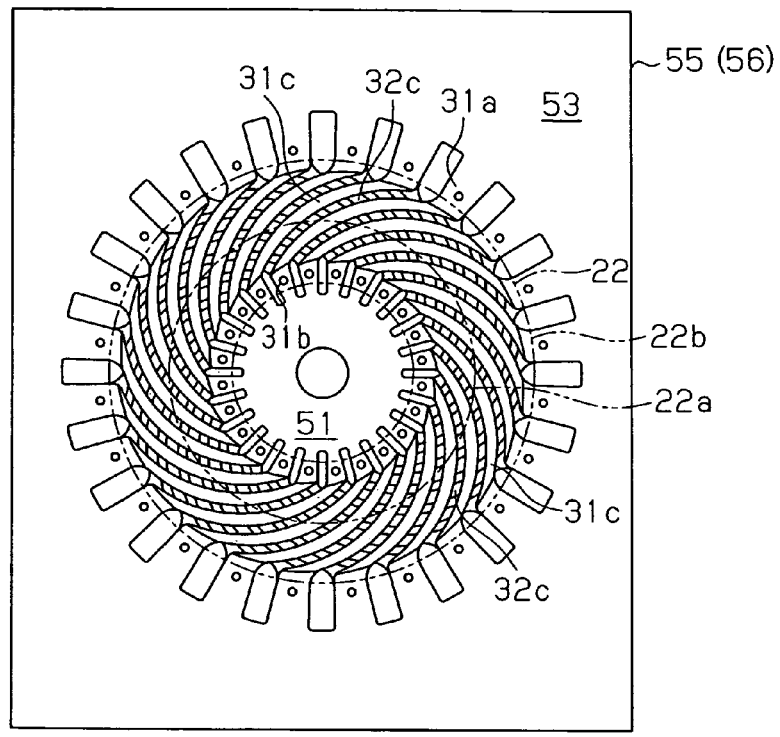
FIG. 5 is a schematic diagram illustrating the method for manufacturing the armature.
Figure 6:
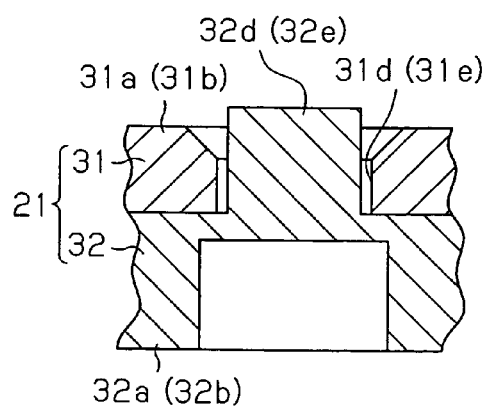
FIGS. 6(a) and 6(b) are schematic diagrams illustrating the method for manufacturing the armature.
Figure 6:
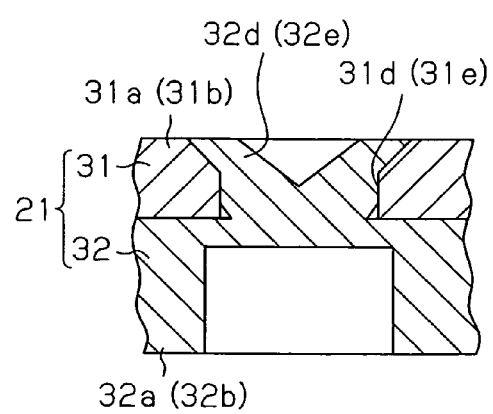

In the superimposing process, the two conductive plates 55 and 56 that have been punched out are superimposed as shown in FIG. 5. Here, the projections 32d and 32e are inserted through the holes 31d and 31e (refer to FIG. 6(a)) and crimped in this state. As a result, the tips of the projections 32d and 32e are deformed to cover the openings of the holes 31d and 31e and fix the two conductive plates 55 and 56 (including the short-circuit member formation groups 31 and 32) to each other (refer to FIG. 6(b)).

After the crimping, the outer terminals 31a and 32a and the inner terminals 31b and 32b are further spot-welded. In detail, the tin plating between the outer terminals 31a and 32a and between the inner terminals 31b and 32b is melted to bond the terminals together.

In the insulator filling process, the short-circuit insulator 22 is formed in the conductive plates 55 and 56 as shown by double-dashed lines in FIG. 5. In detail, the superimposed conductive plates 55 and 56 are placed in a mold (not shown), and molten resin material is filled into the space between various parts (outer terminals 31a and 32a and inner terminals 31b and 32b) and solidified so as to form the boss 22a, the large-diameter portion 22b, and so on. This forms a resin portion including the short-circuit insulator 22. The resin material used here is a thermosetting resin material. The molten resin material is first injected into spaces between the lower linking portions 31c and the upper linking portions 32c (refer to FIG. 1). Then, the resin material flows toward other parts including a part corresponding to the boss 22a through gaps between the linking portions 31c and gaps between the linking portions 32c. This forms the resin portion including the short-circuit insulator 22. The mold used for forming the resin portion has a resin material injection inlet through which the molten resin material is first injected into the gaps between the linking portions 31c and the linking portions 32c.

In the removing process, the inner linking portions 51 and 52 and the outer linking portions 53 and 54 of the conductive plates 55 and 56 are punched out and removed. This completes the manufacture of the short-circuit member 12 shown in FIG. 2.

Next, in a commutator manufacturing process, the short-circuit member 12 is attached to an intermediate member, which becomes the commutator main body 11. In detail, in a process separate from the manufacturing processes of the short-circuit member 12, the intermediate member (not shown) is manufactured by molding the main body insulator 14 in a conductive tubular member (not shown), which includes the commutator pieces 13. The conductive tubular member is arranged in a mold (not shown) and molten resin material is filled into the mold and solidified to form the cylindrical portion 14a in the conductive tubular member. The resin material used for the molding is the thermosetting resin (phenol resin etc.) described above. The mold used for the molding has projections (not shown) for forming the recess 13b (refer to FIG. 7(a)). Thus, the recesses 13b are formed in the conductive tubular member with the mold that molds the resin portion when the mold is clamped.

The short-circuit member 12 is fixed to the axial end portion of the intermediate member, which includes the commutator main body 11, so that its outer terminals 31a and 32a are electrically connected to the commutator pieces 13. In detail, in a state in which the outer terminals 31a and 32a are arranged in the recesses 13b, the short-circuit member 12 undergoes crimping. More specifically, in a state in which the outer terminals 31a and 32a are arranged in the recesses 13b, two walls of the recesses 13b are crimped by the jig (punch) 41 so that the crimped walls partially cover the outer terminals 31a and 32a (refer to FIG. 7(b)). Next, the conductive tubular member is cut in the circumferential direction to form a plurality (twenty-four) of the commutator pieces 13. This completes the manufacture of the commutator 4. In this state, the wire connection portions 13a of the commutator 4 are not yet bent and the coils 5 are yet to be hooked to the wire connection portions 13a.

Next, in a provisional assembly process, the armature core 3 and the commutator 4 are assembled with the rotation shaft 2 by pressing the rotation shaft 2 into the armature core 3 and the commutator 4. In this state, to prevent the distal surface of the boss 22a from coming into contact with the tubular portion 3a of the armature core 3, a gap is formed between the boss 22a and the tubular portion 3a of the armature core 3 in the axial direction.

Next, in a coiling process, in a state in which the coils 5 are hooked on the wire connection portions 13a, the coils 5 are wound around predetermined teeth 3b of the armature core 3 by concentrated winding or distributed winding. In this state, the portion of each coil 5 extending from the corresponding wire connection portion 13a to the corresponding predetermined tooth 3b, that is, the crossover wire 5a, is entwined to and supported by the boss 22a. More specifically, the crossover wire 5a is guided free from direct contact with the rotation shaft 2 so that it is not abruptly bent at a sharp curvature in accordance with the diameter of the rotation shaft 2.

In a main assembly process, at least one of the armature core 3 and the commutator 4 is pressed and moved along the rotation shaft 2 in a manner that the distal surface of the boss 22a is pressed against the tubular portion 3a of the armature core 3 as shown in FIG. 1. This completes the manufacture of the armature 1.

The armature 1 with the above-described structure enables electric current to flow not only through the commutator pieces 13 that are in direct contact with the anode and cathode power feeding brushes but also through the commutator pieces 13 that are in contact with the brushes through the short-circuit conductor 21 of the short-circuit member 12. This structure reduces the number of the anode and cathode power feeding brushes required, and enables electric current to be simultaneously supplied to a larger number of coils 5.

The present embodiment has the advantages described below.

(1) The short-circuit conductor 21 excluding the outer terminals 31a and 32a in the short-circuit member 12, which short-circuits the predetermined commutator pieces 13, is embedded in the short-circuit insulator 22. This prevents the linking portions 31c and 32c of the short-circuit conductor 21 from rubbing against each other and prevents the short-circuit conductor 21 and the coils 5 from rubbing against each other. Thus, layer short-circuiting is prevented.

Additionally, the boss 22a is formed integrally with the short-circuit insulator 22. Thus, the boss 22a contacts the armature core 3, while suppressing an increase in the number of components, and facilitates positioning of the commutator 4 in the axial direction with respect to the armature core 3. Further, the boss 22a is used as a guide for supporting the crossover wire 5a extending from the wire connection portion 13a of a commutator piece 13 to the predetermined tooth 3b of the armature core 3. This prevents the coils 5 from coming into direct contact with the rotation shaft 2, while suppressing an increase in the number of components, and prevents the coils from being abruptly bent at a sharp curvature. Thus, damages of the coils 5 are reduced.

(2) The short-circuit conductor 21 is formed by superimposing the two short-circuit member formation groups 31 and 32, which are generally flat. This suppresses an increase in the axial length of the short-circuit conductor 21 and enables short-circuiting of the predetermined commutator pieces 13. Further, since the short-circuit member formation groups 31 and 32 are generally flat, they are easily formed from the conductive plates 55 and 56.

(3) The lower short-circuit member formation group 31 is thinner than the upper short-circuit member formation group 32. Thus, the projections 32d and 32e are easily projected in comparison to when they are formed in the lower short-circuit member formation group 31 (refer to FIG. 6(a)). Further, the holes 31d and 31e extend through the lower short-circuit member formation group 31. This facilitates crimping when the projections 32d and 32e are inserted through the holes 31d and 31e. In detail, the structure in which the tips of the projections 32d and 32e are crimped to cover the openings of the holes 31d and 31e (refer to FIG. 6(b)) is easily obtained. As a result, the electrical and mechanical connection between the two short-circuit member formation groups 31 and 32 is strong and easily realized. Further, the lower short-circuit member formation group 31 is formed from a copper material and is thinner than the upper short-circuit member formation group 32, which is formed from brass. However, the lower short-circuit member formation group 31 is formed from a material having low electric resistivity. Thus, the short-circuit member formation groups 31 and 32 have substantially the same electric resistance. Further, the material of the upper short-circuit member formation group 32 has a greater electric resistivity than the material of the lower short-circuit member formation group 31. This enables the upper short-circuit member formation group 32 to be formed from a low-cost material such as a brass material in the present embodiment. Thus, cost increases are suppressed.

(4) The main body insulator 14 of the commutator main body 11 and the short-circuit insulator 22 of the short-circuit member 12 are formed from different materials. Thus, for example, by forming the main body insulator 14 with a thermosetting resin, namely, a phenol resin, having superior heat expansion and contraction characteristics and a high mechanical strength, displacement of the commutator pieces 13 in the radial direction is reduced.

The short-circuit member 12 including the short-circuit insulator 22 is arranged on the axial end portion of the commutator main body 11. Thus, even though the short-circuit insulator 22 is formed from a material having relatively poor heat expansion and contraction characteristics and a relatively low mechanical strength (a thermoplastic resin in the present embodiment), the short-circuit insulator 22 does not affect displacement of the commutator pieces 13 in the radial direction. Thus, the short-circuit insulator 22 may be formed from thermoplastic resin to manufacture the short-circuit member 12 with low costs and facilitate recycling.

(5) At the basal portion of the boss 22a in the short-circuit insulator 22, the large-diameter portion 22b, which has an outer diameter that is greater then the boss 22a, projects axially from an end portion of the commutator main body 11 (commutator pieces 13). Thus, when using the boss 22a as a guide for supporting the coils 5 extended to the predetermined teeth 3b of the armature core 3 from the commutator pieces 13, the coils 5 supported by the guide are prevented from contacting the commutator pieces 13. Further, after the coils 5 are extended from the commutator pieces 13 to the predetermined teeth 3b of the armature core 3 and wound about the predetermined teeth 3b, if the commutator 4 is further axially moved toward the armature core 3, the large-diameter portion 22b prevents the coils 5 from contacting the commutator pieces 13.

(6) The short-circuit insulator 22 is formed so that the outer diameter gradually changes from the large-diameter portion 22b to the boss 22a. This prevents the coils 5 from being damaged.

(7) The cylindrical portion 14a is formed on the center of the end portion of the main body insulator 14 and arranged at the inner side of the short-circuit member 12 projecting in the axial direction. Thus, the inner terminals 31b and 32b of the short-circuit conductor 21 is covered by the cylindrical portion 14a and not exposed. Further, the rotation shaft 2 is press-fitted into the cylindrical portion 14a. Thus, the cylindrical portion 14a is arranged between the short-circuit conductor 21 of the short-circuit member 12 and the rotation shaft 2, and the short-circuit conductor 21 is not electrically connected to the rotation shaft 2. In other words, the short-circuit member 12 is easily obtained by employing the above manufacturing method (insulator filling process and then the removing process), and the insulation of the short-circuit conductor 21 is easily ensured.

The above embodiment may be modified in the following forms.

In the above embodiment, the commutator 4 includes the twenty-four commutator pieces 13 short-circuited at 120-degree intervals. However, the number of the commutator pieces 13 included in the commutator 4 may be different, and the short-circuiting angular interval of the short-circuited commutator pieces 13 may be different. For example, a commutator may include sixteen segments short-circuited in 180-degree intervals. In this case, the structure of the short-circuit member 12 is modified accordingly.

In the above embodiment, the short-circuit conductor 21 of the short-circuit member 12 is formed by superimposing the two layers of the short-circuit member formation groups 31 and 32, which are formed into the same layer. However, the present invention is not limited in this manner and may be changed to a short-circuit conductor having other structures (for example, a structure including copper wires or a structure formed by superimposing multiple layers) as long as predetermined commutator pieces 13 can be short-circuited with each other.

In the above embodiment, the linking portions 31c in one of the short-circuit member formation groups 31 are curved in the axial direction (downward in FIG. 1) with respect to the outer terminals 31a and the inner terminals 31b. Thus, the linking portions 31c and 32c are in non-contact with one another in the superimposing direction. However, this may be changed to other structures as long as linking portions are prevented from coming into contact with each other.

Figure 8:
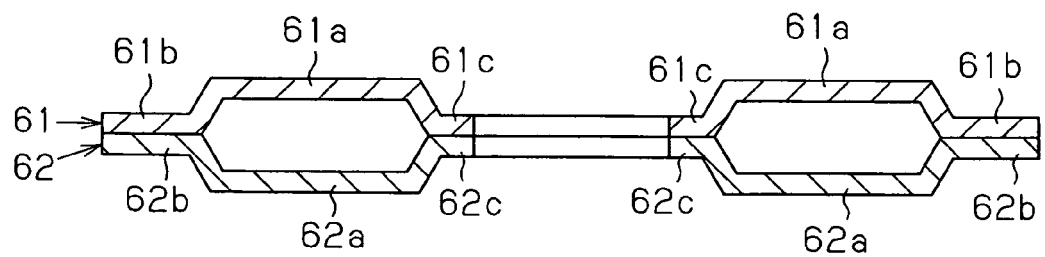
FIG. 8 is a schematic diagram showing a further example of a short-circuit member.

For example, as shown in FIG. 8, linking portions 61a and 62a in two short-circuit member formation groups 61 and 62 may be bent with respect to outer terminals 61b and 62b and inner terminals 61c and 62c in a direction in which the linking portions 61a and 62a are spaced from each other so that the linking portions 61a and 62a do not come in contact with each other in the superimposing direction.

Figure 9:
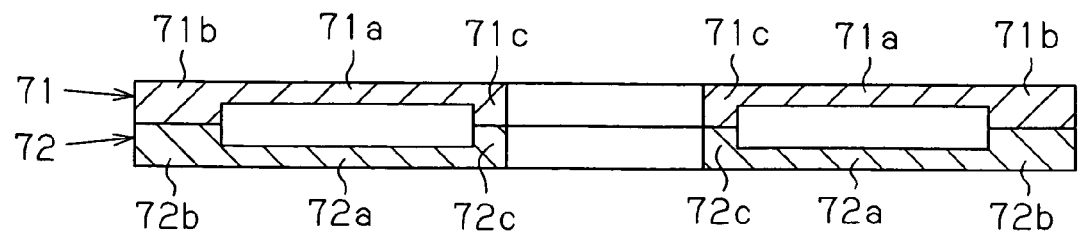
FIG. 9 is a schematic diagram showing a further example of a short-circuit member.

Further, as shown in FIG. 9, linking portions 71a and 72a in two short-circuit member formation groups 71 and 72 may be formed to be thinner than outer terminals 71b and 72b and inner terminals 71c and 72c. In this case, the linking portions 71a and 72a do not come in contact with each other in the superimposing direction.

An insulator paper may be arranged between linking portions in two short-circuit member formation groups to prevent the linking portions from coming into contact with each other in the superimposing direction.

In the above embodiment, the linking portions 31c and 32c in the short-circuit member formation groups 31 and 32 respectively link the outer terminals 31a and 32a and the inner terminals 31b and 32b that are arranged at positions separated from one another by the predetermined angle in the circumferential direction. However, it is only required that the linking portions in at least one of the short-circuit member formation groups link the outer terminals and the inner terminals that are arranged at positions separated from each other by the predetermined angle in the circumferential direction. That is, the linking portions in either one or the other one of the short-circuit member formation groups may extend only in the radial direction (link without separating the outer terminals and the inner terminals in the circumferential direction).

In the above embodiment, each of the linking portions 31c and 32c extends along an involute curve. However, the linking portions 31c and 32c may be formed along other curves or simply along a straight line.

In the above embodiment, one of the short-circuit member formation groups 31 is formed to be thinner than the other one of the short-circuit member formation groups 32. However, the present invention is not limited in such a manner, and, for example, two short-circuit formation groups may have the same thickness.

In the above embodiment, one of the short-circuit member formation groups 31 is formed from a material having a smaller electric resistivity than the material used for the other one of the short-circuit member formation groups 32. However, the present invention is not limited to this structure. For example, the two short-circuit member formation groups may be formed from the same material such as when the two short-circuit member formation groups have the same thickness.

In the above embodiment, the two short-circuit member formation groups 31 and 32 are fixed through crimping and welding. However, the present invention should not be limited to this structure and the short-circuit member formation groups 31 and 32 may be fixed through other structures and methods, for example, through only welding. Further, the welding need not be performed, or welding other than spot welding may be performed. In the above embodiment, the tin plating applied in advance is welded. However, base materials may be melted for the bonding.

In the above embodiment, the main body insulator 14 of the commutator main body 11 and the short-circuit insulator 22 of the short-circuit member 12 are formed from different materials. However, the present invention should not be limited to this structure. For example, the main body insulator and the short-circuit insulator may both be formed from a thermosetting resin (a phenol resin etc.).

In the above embodiment, the large-diameter portion 22b, which has an other diameter that is larger than that of the boss 22a, is formed on the basal portion of the boss 22a in the short-circuit insulator 22 so as to project axially from the axial end portion of the commutator main body 11. However, the large-diameter portion does not have to be formed on the short-circuit insulator.

In the above embodiment, the boss 22a is used for positioning when contacting the armature core 3 and as a guide for supporting the crossover wire 5a. However, the boss 22a does not have to have the two functions. That is, the boss 22a may be used for positioning when contacting the armature core 3 and does not have to support the crossover wire 5a. Alternatively, the boss may be used as a guide for supporting the crossover wire 5a and does not have to contact the armature core 3.

In the above embodiment, the cylindrical portion 14a is formed as a wall in the main body insulator 14. However, the wall may be changed to have other shapes as long as it is arranged at the radially inner side of the short-circuit member 12 projecting axially from the axial end portion of the main body insulator 14. For example, the cylindrical portion 14a may be changed to have a shape divided in the circumferential direction (plural arcs when viewed in the axial direction).

The short-circuit member 12, the commutator 4, and the armature 1 in the above embodiment do not have to be manufactured using the manufacturing methods described above as long as they have similar structures.

In the above embodiment, the boss 22a if formed integrally with the short-circuit insulator 22. However, the boss 22a may be omitted. Further, the large-diameter portion 22b may be omitted.

The invention claimed is:

1. A commutator for a motor having a rotation shaft with a rotation axis, the commutator comprising:
   a commutator main body including a plurality of commutator pieces arranged along a circumference, the center of which is a rotation axis of the motor, and a main body insulator holding the commutator pieces, wherein the main body insulator has a cylindrical portion that extends along the rotation axis of the motor and is pressed-fitted to the rotation shaft;
   a short-circuit member arranged on an end portion of the commutator main body and including a short-circuit conductor, which short-circuits predetermined ones of the commutator pieces, and a short-circuit insulator, in which the short-circuit member is embedded; and
   a boss formed integrally with the short-circuit insulator so as to project from the end portion of the commutator main body, wherein the cylindrical portion of the main body insulator is interposed between the rotation shaft and the short-circuit conductor of the short circuit member.

2. The commutator according to claim 1, wherein the main body insulator and the short-circuit insulator are formed from different materials.

3. The commutator according to claim 1, wherein:
   the short-circuit conductor includes first and second short-circuit member formation groups arranged in a superimposed state;
   each of the short-circuit member formation groups has a plurality of outer terminals arranged about the rotation axis of the commutator in the vicinity of the commutator pieces, a plurality of inner terminals arranged about the rotation axis inward from the outer terminals, and a plurality of linking portions linking the outer terminals to the inner terminals;
   the outer terminals contact one another and the inner terminals contact one another between each of the short-circuit member formation groups, and the linking portions are maintained in non-contact between each of the short-circuit member formation groups;
   the linking portions in at least one of the first and second short-circuit member formation groups links the outer terminals and the inner terminals that are separated from each other by a predetermined angle in the circumferential direction.

4. The commutator according to claim 3, wherein the first short-circuit member formation group is thinner than the second short-circuit member formation group and formed from a material having a small electric resistivity, the second short-circuit member formation group has a projection formed and arranged to extend through a hole formed in the first short-circuit member formation group, the projection being crimped to connect the first and second short-circuit member formation groups.

5. The commutator according to claim 1, wherein the boss of the short-circuit insulator has a basal end defining a large-diameter portion with an outer diameter that is greater than the boss.

6. The commutator according to claim 4, wherein the first short-circuit member formation group is formed from a copper material, and the second short-circuit member formation group is formed from a brass material.

7. The commutator according to claim 1, wherein the main body insulator is formed from a thermosetting resin, and the short-circuit insulator is formed from a thermoplastic resin.

8. An armature comprising:
   a commutator for a motor, the commutator including;
   a commutator main body including a plurality of commutator pieces arranged along a circumference, the center of which is a rotation axis of the motor, and a main body insulator holding the commutator pieces;
   a short-circuit member arranged on an end portion of the commutator main body and including a short-circuit conductor, which short-circuits predetermined ones of the commutator pieces, and a short-circuit insulator, in which the short-circuit member is embedded; and
   a boss formed integrally with the short-circuit insulator so as to project from the end portion of the commutator main body;
   a rotation shaft arranged to extend through the axis of the commutator;
   an armature core fixed to the rotation shaft so as to be axially aligned with the commutator and including a plurality of teeth; and
   a plurality of coils wound around each of the teeth of the armature core, wherein the boss is used as a guide for supporting the coils extending from the commutator pieces to the teeth of the armature core.

9. The armature according to claim 8, wherein the boss contacts the armature core.

* * * * *

UNITED STATES PATENT AND TRADEMARK OFFICE
CERTIFICATE OF CORRECTION

PATENT NO. : 7,414,344 B2  Page 1 of 1
APPLICATION NO. : 11/489239
DATED : August 19, 2008
INVENTOR(S) : Ryohei Kageyama et al.

It is certified that error appears in the above-identified patent and that said Letters Patent is hereby corrected as shown below:

Title Page, Assignee (73), after "Ltd" insert --.--.

Title Page, Assignee (73), delete "Koshai-shi" and insert --Kosai-shi--.

Signed and Sealed this

Fourth Day of November, 2008

JON W. DUDAS
*Director of the United States Patent and Trademark Office*